(12) United States Patent
Kaiser et al.

(10) Patent No.: US 10,830,040 B2
(45) Date of Patent: Nov. 10, 2020

(54) FIELD-LEVEL ANALYSIS OF DOWNHOLE OPERATION LOGS

(71) Applicants: Jonas Kaiser, Celle (DE); Nicklas Ritzmann, Celle (DE); Stefan Wessling, Hannover (DE)

(72) Inventors: Jonas Kaiser, Celle (DE); Nicklas Ritzmann, Celle (DE); Stefan Wessling, Hannover (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 469 days.

(21) Appl. No.: 15/728,693

(22) Filed: Oct. 10, 2017

(65) Prior Publication Data
US 2019/0106986 A1    Apr. 11, 2019

(51) Int. Cl.
| | | |
|---|---|---|
| *G01V 1/40* | (2006.01) | |
| *E21B 49/00* | (2006.01) | |
| *G05B 15/02* | (2006.01) | |
| *E21B 41/00* | (2006.01) | |
| *E21B 47/18* | (2012.01) | |

(52) U.S. Cl.
CPC .............. *E21B 49/00* (2013.01); *E21B 41/00* (2013.01); *G05B 15/02* (2013.01); *E21B 47/18* (2013.01)

(58) Field of Classification Search
None
See application file for complete search history.

(56) References Cited

U.S. PATENT DOCUMENTS

| | | | |
|---|---|---|---|
| 4,577,153 A | 3/1986 | Stolarczyk | |
| 9,004,195 B2 | 4/2015 | Regener et al. | |
| 10,229,360 B2 * | 3/2019 | Towailib | G06Q 10/08 |
| 2008/0208476 A1 | 8/2008 | Karami | |
| 2010/0206559 A1 * | 8/2010 | Sequeira, Jr. | E21B 41/00 166/250.15 |
| 2017/0198553 A1 * | 7/2017 | Dykstra | E21B 21/00 |
| 2018/0016896 A1 * | 1/2018 | Tang | E21B 21/063 |

FOREIGN PATENT DOCUMENTS

| | | |
|---|---|---|
| WO | 2009093105 A1 | 7/2009 |
| WO | 2016153502 A1 | 9/2016 |

OTHER PUBLICATIONS

International Search Report, International Application No. PCT/US2018/054674, dated Jan. 17, 2019, Korean Intellectual Property Office; International Search Report 3 pages.
International Written Opinion, International Application No. PCT/US2018/054674, dated Jan. 17, 2019, Korean Intellectual Property Office; International Written Opinion 10 pages.

* cited by examiner

*Primary Examiner* — Aditya S Bhat
(74) *Attorney, Agent, or Firm* — Cantor Colburn LLP (57) ABSTRACT

Systems and methods for performing field-wide downhole operations, the field having a plurality of wells. Methods include obtaining, at a computing system, a reference data set associated with the field, the reference data set including at least one property of a downhole formation, obtaining, at the computing system, a first well data set associated with a first well of the field, the first well data set including the at least one property of a downhole formation associated with the first well, calculating a similarity index ratio based on the reference data set and the first well data set, wherein the similarity index ratio indicates a similarity in values of the reference data set and the first well data set, and performing a responsive action based on the calculated similarity index ratio.

20 Claims, 6 Drawing Sheets

FIELD-LEVEL ANALYSIS OF DOWNHOLE OPERATION LOGS

BACKGROUND

1. Field of the Invention

The present invention generally relates to downhole operations and systems for monitoring downhole dynamic events.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to a material (e.g., a gas or fluid) contained in a formation (e.g., a compartment) located below the earth's surface. Different types of tools and instruments may be disposed in the boreholes to perform various tasks and measurements. Obtaining information for making decisions for drilling operations, production operations, etc. is important to effectively perform such operation.

For example, mud gas logging is a standard service in almost every drilling operation. Typically such logging data is used to make drilling operation decisions at that well, such as determining if a target formation or compartment has been reached by the well. Improved data collection and analysis can be used to further increase efficiency of downhole operations.

SUMMARY

Disclosed herein are systems and methods for performing field-wide downhole operations, the field having a plurality of wells. Methods include obtaining, at a computing system, a reference data set associated with the field, the reference data set including at least one property of a downhole formation, obtaining, at the computing system, a first well data set associated with a first well of the field, the first well data set including the at least one property of a downhole formation associated with the first well, calculating a similarity index ratio based on the reference data set and the first well data set, wherein the similarity index ratio indicates a similarity in values of the reference data set and the first well data set, and performing a responsive action based on the calculated similarity index ratio.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Figure 1:
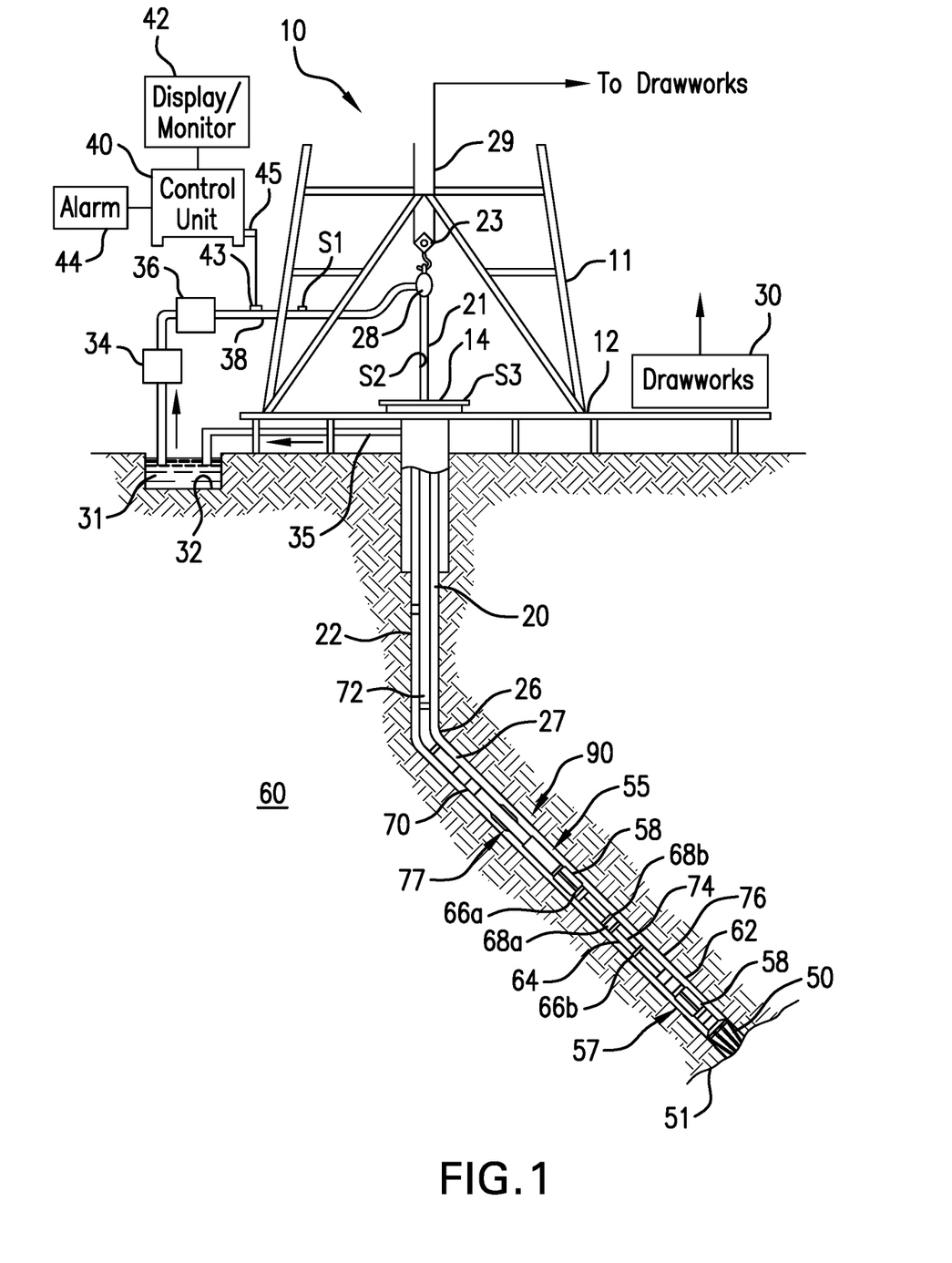
FIG. 1 is an example of a system for performing downhole operations that can employ embodiments of the present disclosure.

FIG. 1 shows a schematic diagram of a system for performing downhole operations. As shown, the system is a drilling system 10 that includes a drill string 20 having a drilling assembly 90, also referred to as a bottomhole assembly (BHA), conveyed in a borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling tubular 22, such as a drill pipe, extending downward from the rotary table 14 into the borehole 26. A disintegrating tool 50, such as a drill bit attached to the end of the BHA 90, disintegrates the geological formations when it is rotated to drill the borehole 26. The drill string 20 is coupled to surface equipment such as systems for lifting, rotating, and/or pushing, including, but not limited to, a drawworks 30 via a kelly joint 21, swivel 28 and line 29 through a pulley 23. In some embodiments, the surface equipment may include a top drive (not shown). During the drilling operations, the drawworks 30 is operated to control the weight on bit, which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the drill string 20 via a desurger 36, fluid line 38 and the kelly joint 21. The drilling fluid 31 is discharged at the borehole bottom 51 through an opening in the disintegrating tool 50. The drilling fluid 31 circulates uphole through the annular space 27 between the drill string 20 and the borehole 26 and returns to the mud pit 32 via a return line 35. A sensor S1 in the fluid line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the borehole 26. The system may further include one or more downhole sensors 70 located on the drill string 20 and/or the BHA 90.

In some applications the disintegrating tool 50 is rotated by only rotating the drill pipe 22. However, in other applications, a drilling motor 55 (mud motor) disposed in the drilling assembly 90 is used to rotate the disintegrating tool 50 and/or to superimpose or supplement the rotation of the drill string 20. In either case, the rate of penetration (ROP) of the disintegrating tool 50 into the borehole 26 for a given formation and a drilling assembly largely depends upon the weight on bit and the drill bit rotational speed. In one aspect of the embodiment of FIG. 1, the mud motor 55 is coupled to the disintegrating tool 50 via a drive shaft (not shown) disposed in a bearing assembly 57. The mud motor 55 rotates the disintegrating tool 50 when the drilling fluid 31 passes through the mud motor 55 under pressure. The bearing assembly 57 supports the radial and axial forces of the disintegrating tool 50, the downthrust of the drilling motor and the reactive upward loading from the applied weight on bit. Stabilizers 58 coupled to the bearing assembly 57 and other suitable locations act as centralizers for the lowermost portion of the mud motor assembly and other such suitable locations.

A surface control unit 40 receives signals from the downhole sensors 70 and devices via a transducer 43, such as a pressure transducer, placed in the fluid line 38 as well as from sensors S1, S2, S3, hook load sensors, RPM sensors, torque sensors, and any other sensors used in the system and processes such signals according to programmed instructions provided to the surface control unit 40. The surface control unit 40 displays desired drilling parameters and other information on a display/monitor 42 for use by an operator at the rig site to control the drilling operations. The surface control unit 40 contains a computer, memory for storing data, computer programs, models and algorithms accessible to a processor in the computer, a recorder, such as tape unit, memory unit, etc. for recording data and other peripherals. The surface control unit 40 also may include simulation models for use by the computer to processes data according to programmed instructions. The control unit responds to user commands entered through a suitable device, such as a keyboard. The control unit 40 is adapted to activate alarms 44 when certain unsafe or undesirable operating conditions occur.

The drilling assembly 90 also contains other sensors and devices or tools for providing a variety of measurements relating to the formation surrounding the borehole and for drilling the borehole 26 along a desired path. Such devices may include a device for measuring the formation resistivity near and/or in front of the drill bit, a gamma ray device for measuring the formation gamma ray intensity and devices for determining the inclination, azimuth and position of the drill string. A formation resistivity tool 64, made according an embodiment described herein may be coupled at any suitable location, including above a lower kick-off subassembly 62, for estimating or determining the resistivity of the formation near or in front of the disintegrating tool 50 or at other suitable locations. An inclinometer 74 and a gamma ray device 76 may be suitably placed for respectively determining the inclination of the BHA and the formation gamma ray intensity. Any suitable inclinometer and gamma ray device may be utilized. In addition, an azimuth device (not shown), such as a magnetometer or a gyroscopic device, may be utilized to determine the drill string azimuth. Such devices are known in the art and therefore are not described in detail herein. In the above-described exemplary configuration, the mud motor 55 transfers power to the disintegrating tool 50 via a hollow shaft that also enables the drilling fluid to pass from the mud motor 55 to the disintegrating tool 50. In an alternative embodiment of the drill string 20, the mud motor 55 may be coupled below the resistivity measuring device 64 or at any other suitable place.

Still referring to FIG. 1, other logging-while-drilling (LWD) devices (generally denoted herein by numeral 77), such as devices for measuring formation porosity, permeability, density, rock properties, fluid properties, etc. may be placed at suitable locations in the drilling assembly 90 for providing information useful for evaluating the subsurface formations along borehole 26. Such devices may include, but are not limited to, temperature measurement tools, pressure measurement tools, borehole diameter measuring tools (e.g., a caliper), acoustic tools, nuclear tools, nuclear magnetic resonance tools and formation testing and sampling tools.

The above-noted devices transmit data to a downhole telemetry system 72, which in turn transmits the received data uphole to the surface control unit 40. The downhole telemetry system 72 also receives signals and data from the surface control unit 40 including a transmitter and transmits such received signals and data to the appropriate downhole devices. In one aspect, a mud pulse telemetry system may be used to communicate data between the downhole sensors 70 and devices and the surface equipment during drilling operations. A transducer 43 placed in the fluid line 38 (e.g., mud supply line) detects the mud pulses responsive to the data transmitted by the downhole telemetry 72. Transducer 43 generates electrical signals in response to the mud pressure variations and transmits such signals via a conductor 45 to the surface control unit 40. In other aspects, any other suitable telemetry system may be used for two-way data communication (e.g., downlink and uplink) between the surface and the BHA 90, including but not limited to, an acoustic telemetry system, an electro-magnetic telemetry system, an optical telemetry system, a wired pipe telemetry system which may utilize wireless couplers or repeaters in the drill string or the borehole. The wired pipe may be made up by joining drill pipe sections, wherein each pipe section includes a data communication link that runs along the pipe. The data connection between the pipe sections may be made by any suitable method, including but not limited to, hard electrical or optical connections, induction, capacitive, resonant coupling, or directional coupling methods. In case a coiled-tubing is used as the drill pipe 22, the data communication link may be run along a side of the coiled-tubing.

The drilling system described thus far relates to those drilling systems that utilize a drill pipe to conveying the drilling assembly 90 into the borehole 26, wherein the weight on bit is controlled from the surface, typically by controlling the operation of the drawworks. However, a large number of the current drilling systems, especially for drilling highly deviated and horizontal boreholes, utilize coiled-tubing for conveying the drilling assembly downhole. In such application a thruster is sometimes deployed in the drill string to provide the desired force on the drill bit. Also, when coiled-tubing is utilized, the tubing is not rotated by a rotary table but instead it is injected into the borehole by a suitable injector while the downhole motor, such as mud motor 55, rotates the disintegrating tool 50. For offshore drilling, an offshore rig or a vessel is used to support the drilling equipment, including the drill string.

Still referring to FIG. 1, a resistivity tool 64 may be provided that includes, for example, a plurality of antennas including, for example, transmitters 66a or 66b and/or receivers 68a or 68b. Resistivity can be one formation property that is of interest in making drilling decisions. Those of skill in the art will appreciate that other formation property tools can be employed with or in place of the resistivity tool 64.

Liner drilling can be one configuration or operation used for providing a disintegrating device becomes more and more attractive in the oil and gas industry as it has several advantages compared to conventional drilling. One example of such configuration is shown and described in commonly owned U.S. Pat. No. 9,004,195, entitled "Apparatus and Method for Drilling a Borehole, Setting a Liner and Cementing the Borehole During a Single Trip," which is incorporated herein by reference in its entirety. Importantly, despite a relatively low rate of penetration, the time of getting the liner to target is reduced because the liner is run in-hole while drilling the borehole simultaneously. This may be beneficial in swelling formations where a contraction of the drilled well can hinder an installation of the liner later on. Furthermore, drilling with liner in depleted and unstable reservoirs minimizes the risk that the pipe or drill string will get stuck due to hole collapse.

Although FIG. 1 is shown and described with respect to a drilling operation, those of skill in the art will appreciate that similar configurations, albeit with different components, can be used for performing different downhole operations. For example, wireline, coiled tubing, and/or other configurations can be used as known in the art. Further, production configurations can be employed for extracting and/or injecting materials from/into earth formations. Thus, the present disclosure is not to be limited to drilling operations but can be employed for any appropriate or desired downhole operation(s).

Figure 2:
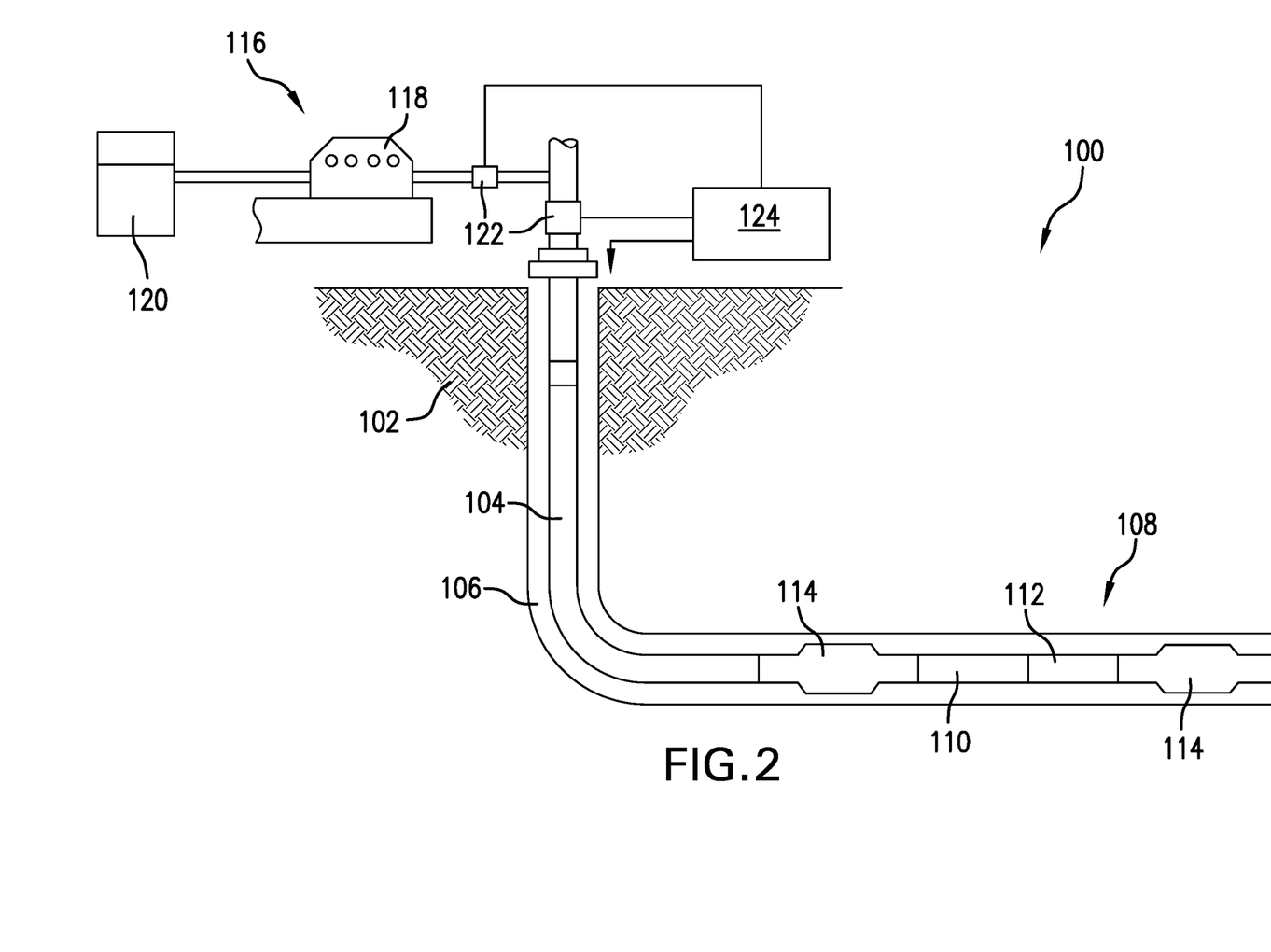
FIG. 2 depicts a system for formation stimulation and hydrocarbon production that can incorporate embodiments of the present disclosure.

Turning to FIG. 2, a schematic illustration of an embodiment of a system 100 for hydrocarbon production and/or evaluation of an earth formation 102 that can employ embodiments of the present disclosure is shown. The system 100 includes a borehole string 104 disposed within a borehole 106. The string 104, in one embodiment, includes a plurality of string segments or, in other embodiments, is a continuous conduit such as a coiled tube. As described herein, "string" refers to any structure or carrier suitable for lowering a tool or other component through a borehole or connecting a drill bit to the surface, and is not limited to the structure and configuration described herein. The term "carrier" as used herein means any device, device component, combination of devices, media, and/or member that may be used to convey, house, support, or otherwise facilitate the use of another device, device component, combination of devices, media, and/or member. Example, non-limiting carriers include, but are not limited to, casing pipes, wirelines, wireline sondes, slickline sondes, drop shots, downhole subs, bottomhole assemblies, and drill strings.

In one embodiment, the system 100 is configured as a hydraulic stimulation system. As described herein, "stimulation" may include any injection of a fluid into a formation. A fluid may be any flowable substance such as a liquid or a gas, or a flowable solid such as sand. In such embodiment, the string 104 includes a downhole assembly 108 that includes one or more tools or components to facilitate stimulation of the formation 102. For example, the string 104 includes an assembly 110, such as a fracture or "frac" sleeve device or an electrical submersible pumping system, and a perforation assembly 112. Examples of the perforation assembly 112 include shaped charges, torches, projectiles, and other devices for perforating a borehole wall and/or casing. The string 104 may also include additional components, such as one or more isolation or packer subs 114.

One or more of the downhole assembly 108, the assembly 110, the perforation assembly 112, and/or the packer subs 114 may include suitable electronics or processors configured to communicate with a surface processing unit and/or control the respective tool or assembly.

A surface system 116 can be provided to extract material (e.g., fluids) from the formation 102 or to inject fluids through the string 104 into the formation 102 for the purpose of fracking.

As shown, the surface system 116 includes a pumping device 118 in fluid communication with a tank 120. In some embodiments, the pumping device 118 can be used to extract fluid, such as hydrocarbons, from the formation 102, and store the extracted fluid in the tank 120. In other embodiments, the pumping device 118 can be configured to inject fluid from the tank 120 into the string 104 to introduce fluid into the formation 102, for example, to stimulate and/or fracture the formation 102.

One or more flow rate and/or pressure sensors 122, as shown, are disposed in fluid communication with the pumping device 118 and the string 104 for measurement of fluid characteristics. The sensors 122 may be positioned at any suitable location, such as proximate to (e.g., at the discharge output) or within the pumping device 118, at or near a wellhead, or at any other location along the string 104 and/or within the borehole 106.

A processing and/or control unit 124 is disposed in operable communication with the sensors 122, the pumping device 118, and/or components of the downhole assembly 108. The processing and/or control unit 124 is configured to, for example, receive, store, and/or transmit data generated from the sensors 122 and/or the pumping device 118, and includes processing components configured to analyze data from the pumping device 118 and the sensors 122, provide alerts to the pumping device 118 or other control unit and/or control operational parameters, and/or communicate with and/or control components of the downhole assembly 108. The processing and/or control unit 124 includes any number of suitable components, such as processors, memory, communication devices and power sources.

In efforts to maximize the efficiency of drilling systems (e.g., as shown in FIG. 1), completion systems, and/or production systems (e.g., as shown in FIG. 2), data can be collected from downhole locations, during drilling operations (e.g., mud gas logging, logging-while-drilling, measurement-while-drilling, etc.), during completion operations, and/or during production operations. The collected data can be used to perform analysis of the downhole conditions, environment, and/or determine other properties and/or characteristics of downhole formations, reservoirs, etc.

For example, mud gas logging and other logging techniques are standard services on almost all drilling operations for downhole formation exploration. Such collected information can be used for the identification of potentially productive zones in subsurface formation(s) with geoscience interpretation which can lead to better decisions in completion programs. Typically, such analysis is made at each individual well, such that action or planning can be performed with respect to the respective well. However, embodiments provided herein are directed to assessing an entire field (e.g., multiple wells) based on mud gas analysis data collected from two or more of the wells in the field. Embodiments provided herein allow for an enhanced understanding of reservoir fluid composition and division from surface logging derived gas measurements, integrated with other classical formation evaluation tools. In heavily compartmentalized fields, classical formation evaluation data is often not sufficient to identify fluid boundaries and what degree of communication exists. Embodiments provided herein can improve operations at heavily compartmentalized fields, among providing other benefits and features.

In some example embodiments in accordance with the present disclosure, various ratios of hydrocarbon concentrations of methane ($C_1$) to pentane ($C_5$), to eliminate uncertainties related to geochemistry. In some embodiments, in addition to standard mud gas concentrations ($C_1$ to $C_5$), advanced gas analysis data including hexane ($C_6$) and heptane ($C_7$), as an example, can be obtained from the wells to provide additional information and value to analysis of downhole formations.

Figure 3:
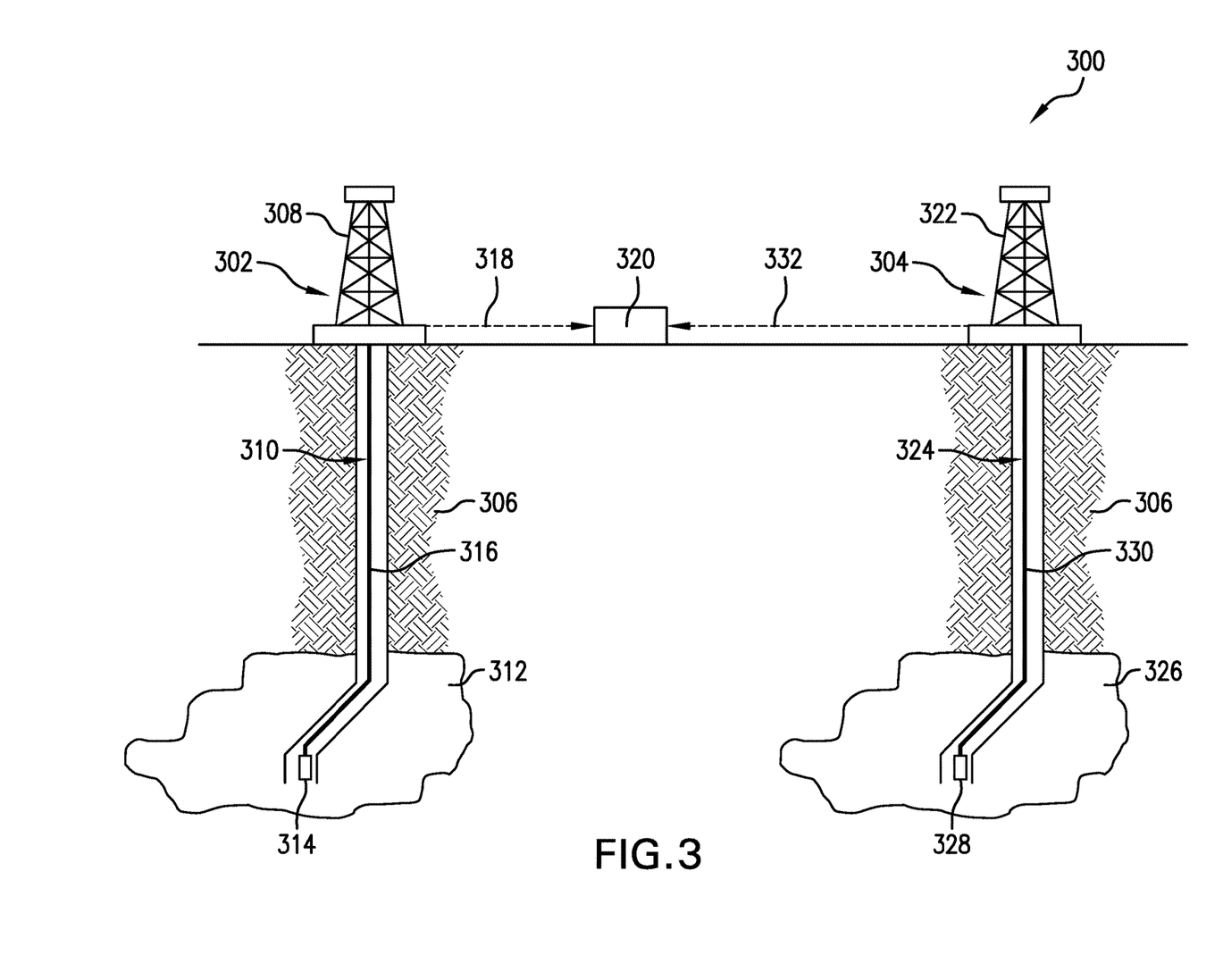
FIG. 3 is a schematic illustration of a field illustrating multiple systems for performing downhole operation in or at the field.

Turning now to FIG. 3, a schematic illustration of a field 300 having a first well 302 and a second well 304 arranged relative to an earth formation 306 is shown. Although shown with two wells, those of skill in the art will appreciate that the field 300 can be configured with any number of wells, wherein each well is located at a different position and provides access to a portion of earth formation 306 at the respective well.

As shown, the first well 302 includes a first surface system 308 which can be a drilling system (e.g., as shown in FIG. 1) that is used to drill a first borehole 310 into the earth formation 306. The first borehole 310 can be drilled to a first formation feature 312, such as a compartment, fluid formation, fluid reservoir, or other area or region of interest. The first well 302 further includes a first bottom hole assembly 314 that is located at bottom or end of the first borehole 310, e.g., installed at the end of a first string 316. In some embodiments, the first bottom hole assembly 314 is a drilling system and the first string 316 is a drill string, in other embodiments, the first bottom hole assembly 314 may be a downhole production system on the end of production tubing (e.g., first string 316), and other system configurations are possible.

The first bottomhole assembly 314 can be arranged to extract material from the first formation feature 312. The extracted material can be conveyed to the surface and to the first surface system 308 for analysis or for other purposes. In some embodiments, data collected from analysis of the material from the first formation feature 312 can be transmitted through a first communication line 318 to a computing system 320. The communication line can be wired or wireless. The computing system 320 may then perform analysis as described herein. In some embodiments, the first bottomhole assembly 314 can obtain data downhole (e.g., using sensors, collectors, downhole analysis tools, etc.) and transmit the data to the surface, which can then be transmitted to the computing system 320. The computing system 320 is a computer or other analytical or processing electronic device or system that is capable of receiving data, performing operations on the data, and outputting information from the operations performed on the data. As used herein, the term "first well data" refers to data collected from the first well 302.

As shown, the second well 304 includes a second surface system 322 which can be a drilling system (e.g., as shown in FIG. 1) that is used to drill a second borehole 324 into the earth formation 306. The second borehole 324 can be drilled to a second formation feature 326, such as a compartment, fluid formation, fluid reservoir, or other area or region of interest. The second well 304 further includes a second bottom hole assembly 328 that is located at bottom or end of the second borehole 324, e.g., installed at the end of a second string 330. In some embodiments, the second bottom hole assembly 328 is a drilling system and the second string 330 is a drill string, in other embodiments, the second bottom hole assembly 328 may be a downhole production system on the end of production tubing (e.g., second string 330), and other system configurations are possible.

The second bottomhole assembly 328 can be arranged to extract material from the second formation feature 326. The extracted material can be conveyed to the surface and to the second surface system 322 for analysis or for other purposes. In some embodiments, data collected from analysis of the material from the second formation feature 326 can be transmitted through a second communication line 332 to the computing system 320. The computing system 320 may then perform analysis as described herein. In some embodiments, the second bottomhole assembly 328 can obtain data downhole (e.g., using sensors, collectors, downhole analysis tools, etc.) and transmit the data to the surface, which can then be transmitted to the computing system 320. As used herein, the term "second well data" refers to data collected from the second well 304.

The computing system 320 will receive the first well data and the second well data, and can then perform analysis thereon. In some embodiments, the computing system 320 will perform a comparison operation on the first well data and the second well data. The comparison operation can be used to determine if the first formation feature 312 is similar to or different from the second formation feature 326, or vice versa.

Embodiments of the present disclosure are directed to correlating and comparing data logs over field-scale, such as applied to field 300 shown in FIG. 3. In one example, a logarithm can be performed on compared data, e.g., a ratio of the first well data to the second well data. The logarithm of the well data will yield similarity index value ratio (SIR). When the similarity index ratio is 0 (SIR=0), the value of the first well data is equal to or the same as value of the second well data, whereas similarity index ratio value above or below zero indicates a higher or lower value respectively, which in turn indicates a difference in values between the first well data and the second well data. Extreme similarity index ratio values (e.g., further from zero) indicate a lower similarity in the respective point, which indicates that the respective formation feature (e.g., first and second formation features 312, 326) are dissimilar. The closer to zero the similarity index ratio, the more likely that the formation features are similar or possibly the same formation feature (e.g., the first and second wells are accessing the same formation feature).

In accordance with an embodiment of the present disclosure, the similar index ratio can be calculated as follows:

$$SIR = \log\left(\frac{\beta_2}{\beta_1}\right) \quad (1)$$

In equation (1), SI is the similarity index ratio, $\beta_1$ is the first well data, and $\beta_2$ is the second well data. The first and second well data $\beta_1$, $\beta_2$ are the same measured value, characteristic, or property from associated wells. Thus, the ratio of $\beta_2/\beta_1$ is unitless. The similarity index ratio is used to compare different wells, rather than comparing various fluids or materials within a single well. In some embodiments the first well data $\beta_1$ can be a reference value or synthetic/artificial data representative of an expected result obtained from a well. In some embodiments, the first well data $\beta_1$ can be a first-drilled well in a field and all other wells can be compared against values or data of the first well to ensure a desired exploration and/or drilling operation at a field-wide level.

The first and second well data $\beta_1$, $\beta_2$, as used in equation (1), are variables for ratios, well-log readings, or other data obtained from respective wells, with the data obtained at the same depth interval. In one non-limiting example, mud gas analysis data can be used to perform the comparison of the present disclosure. For example, ratios of the gas compounds $C_1$ (methane), $C_2$ (ethane), $C_3$ (propane), $C_4$ (butane and isomer) and $C_5$ (pentane and isomers) can be analyzed and compared. These compounds and applications are non-exclusive examples and among others, the approach can be extended to the analysis of advanced gas ratios (including, but not limited to, $C_6$ (hexanes), $C_7$ (heptanes), and $C_8$ (octanes) compounds and associated isomers) or formation evaluation datasets like gamma ray or resistivity readings.

Figure 4:
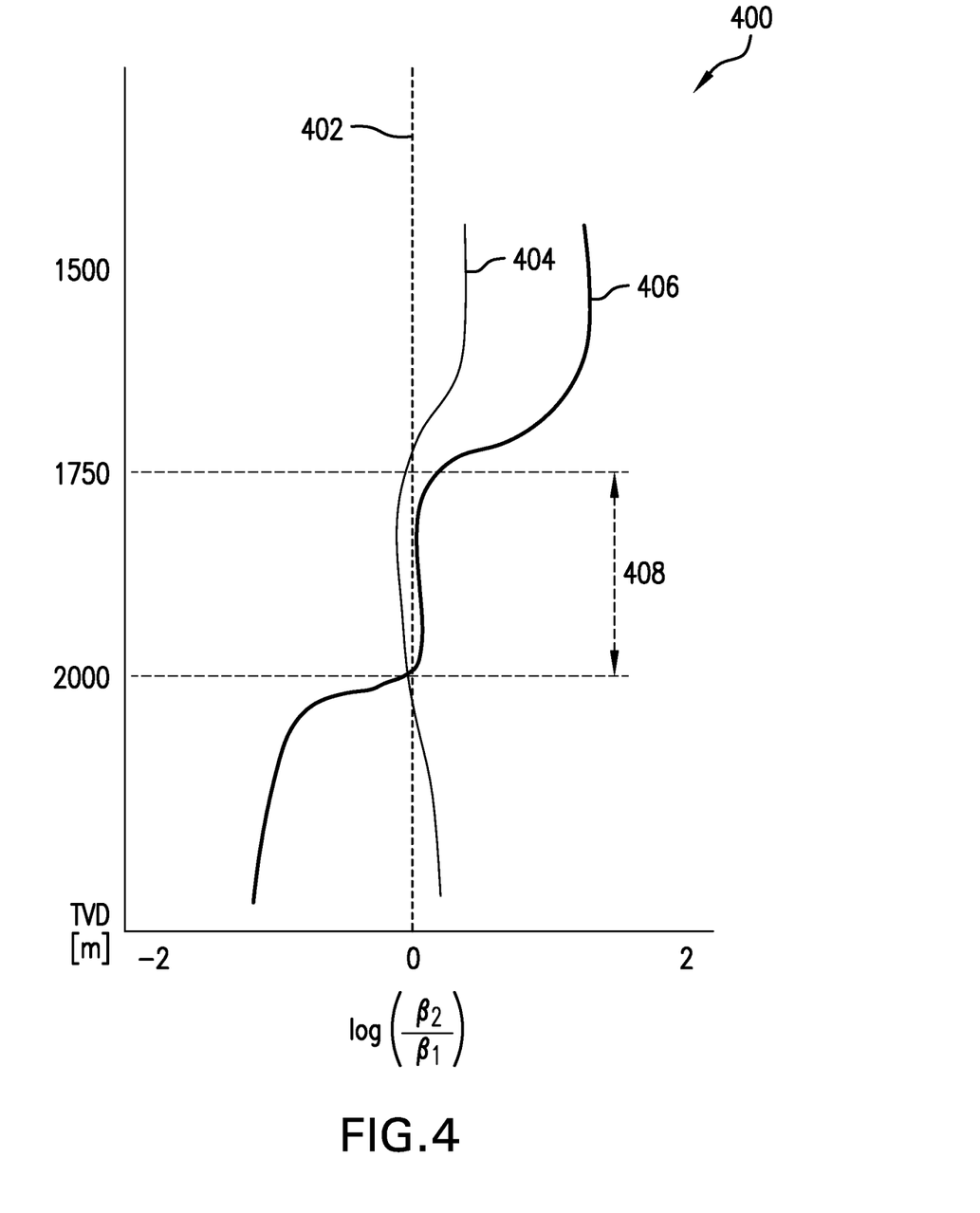
FIG. 4 is a plot illustrating application of a similarity index value ratio (SIR) in accordance with an example embodiment of the present disclosure.

Accordingly, the similarity index ratio can provide a ratio comparing various wells in a depth perspective. For example, such comparison can be illustrated as shown in plot 400 of FIG. 4. A big advantage of embodiments of the present disclosure is the comparability of various well sections amongst each other in one plot. In FIG. 4, the vertical axis of plot 400 is True Vertical Depth (in meters) and the horizontal axis is the similarity index ratio $$\left(SIR = \log\left(\frac{\beta_2}{\beta_1}\right)\right).$$

Plotted on plot 400 is a plot of a reference data set 402, a plot of first well data 404, and a plot of second well data 406. On the plot 400, positive SIR values represent the well data 404, 406 being more than the associated value of the reference data set 402 and negative SIR values represent the well data 404, 406 is greater than the associated value of the reference data set 402.

As shown, a region or depth interval of similarity 408 is present between 1,750 meters and 2,000 meters in the illustrative example. The region of similarity 408 is a region (e.g., an interval of depth of the wells) where the first and second wells have values that are at or near the reference data set 402, and thus the SIR values are close to zero. Such correlation between the first and second wells (well data 404, 406) and the reference data set 402 may indicate that the first and second wells are located in a desired compartment or downhole earth formation (having a desired composition or other characteristic/property). In embodiments where the reference data set 402 is a reference well within a field, a plot as shown in FIG. 4 indicates that the first and second wells are penetrating the same or substantially similar formation, compartment, etc. as the reference well over the depth interval indicated by the region of similarity 408.

Well sections that do not fit in the general trend due to, for example, a different fluid distribution or filling, will stick out from the rest as they plot more towards the edges of the plot. For example, as shown in FIG. 4, in the regions outside of region of similarity 408, one or both of the first and second well data 404, 406 deviate from the zero line defined by the reference data 402. Such deviations indicate differences in SIR, which in turn indicates that the monitored and/or compared characteristic is deviant for these depths of the wells, thus indicating that the wells are not located within the same compartment, formation, etc.

Figure 5:
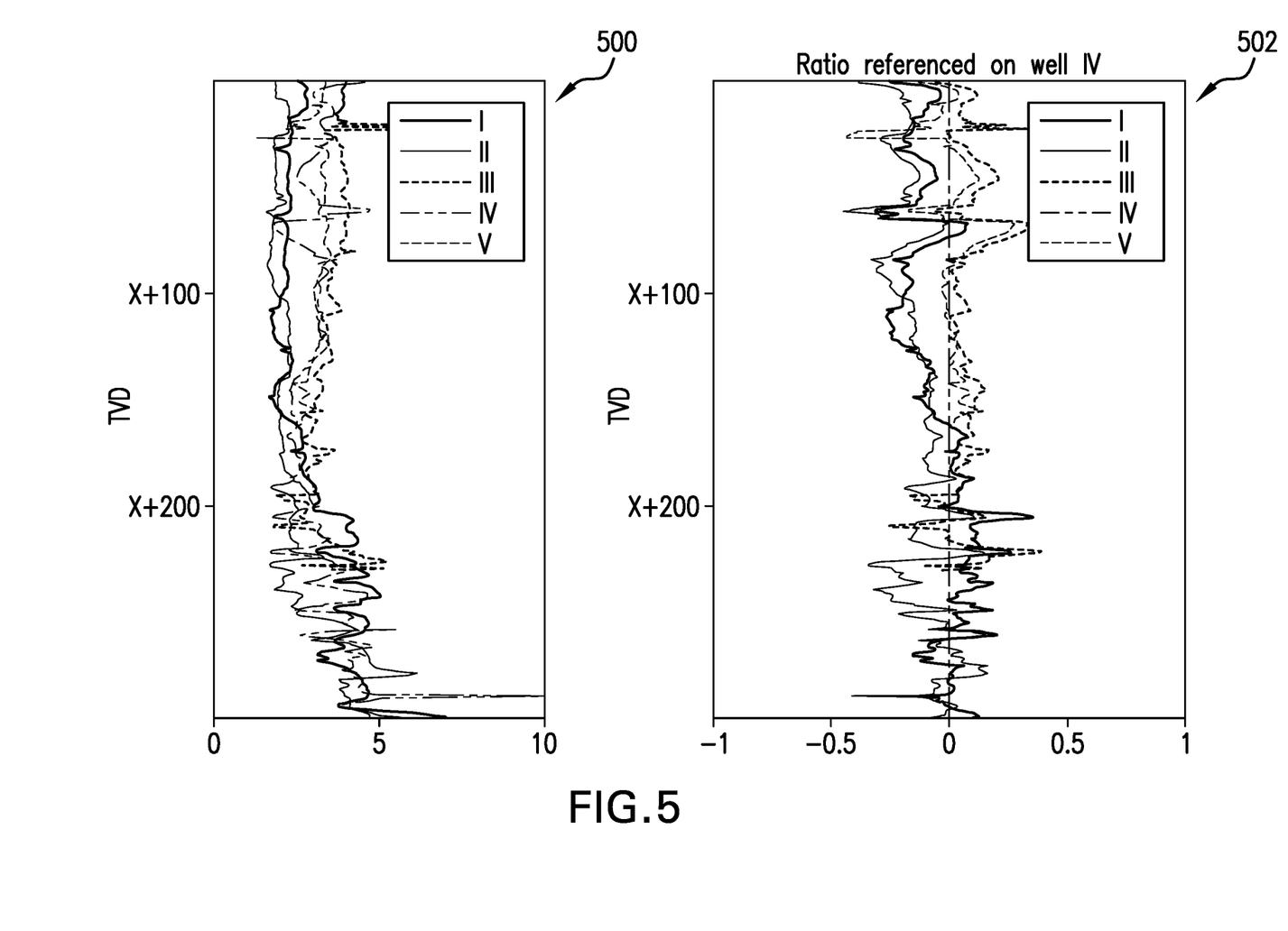
FIG. 5 is an example comparing a real-value plot and a similarity index value ratio plot in accordance with another example embodiment of the present disclosure.

Turning now to FIG. 5, plots 500, 502 illustrates an example set of data obtained from five wells located in a single field. In this illustration, plot 500 has true vertical depth on the vertical axis and a value of the ratio on the horizontal axis, and plot 502 has true vertical depth on the vertical axis and a similarity index ratio SIR value on the horizontal axis. In this illustrative embodiment, $$SIR = \log\left(\frac{Ratio}{Ratio_{ref}}\right).$$

In plot 500, five wells logs of the ratios were obtained at the field: wells I, II, III, IV, and V. In plot 502, the similarity index ratio SIR of four of the wells (I, II, III, and V) are shown referenced against well IV. Although it may be difficult to determine which wells are similar from the plot 500, as is apparent from the plot 502, in the Interval between X+100 and X+200, the wells III and V have a close similarity to the same ratio of IV. In contrast, the wells I and II yield a different pattern and the SIR values of those wells are around 0.2, thus indicating a lower ratio in this segment. Such discrepancy between the wells, based on the SIR values/ratios, may indicate that the fluid fill in these wells is not related to the fluid in the same segment (e.g., at the same interval of depth) of the other wells.

The well comparisons and similarity index ratio SIR are not limited to specific input parameters or formation properties/characteristics and embodiments provided herein can be used to compare various datasets, trends, and ratios with each other at a field-scale level. In some embodiments, the reference data set can be a well located in the field, and in other embodiments the reference data set may be synthetic or artificial data. Using synthetic or artificial data can enable a determination of which wells in a field have a desired characteristic, property, etc., with similar wells having a pattern that will cluster together.

Although FIG. 5 is described with a variance or SIR value of 0.2 being a deviation and thus implying a different formation/compartment/characteristic/property of a given well data set against a reference data set, such value is not to be limiting. For example, in another non-limiting example, SIR values of ±0.1 or less can be interpreted as indicating that two wells are similar, and values greater than ±0.1 can be interpreted as indicating that two wells are dissimilar. That is, SIR values between −0.1 and +0.1 are indicative of similar wells and values outside of this range are considered dissimilar.

Beyond the simple comparison of wells for reservoir characterization purposes, the similarity index ratio SIR of the present disclosure can also assist in quality control during drilling processes and help in monitoring drilled and measured values (R) in comparison to an expected reference value ($R_{Ref}$). That is, various applications of embodiments of the present disclosure can be employed to obtain geochemical reservoir property characteristics for certain reservoir sections. Additionally, embodiment may be employed for obtaining and/or monitoring drilling and/or rock parameters which are obtained through logging during drilling operations. For example, in one non-limiting example, a color coded log giving different responses for a deviation from the 0 SIR value may help in the interpretation and quick assessment of the present drilling progress. Sections that are differing from the expected or planned values can then be easily identified by a shift in the color pattern. Boundary values where a response can be identified as dissimilar, depend heavily on the observed and interpreted ratio or log and, therefore, can be difficult to define in typical drilling operations.

Figure 6:
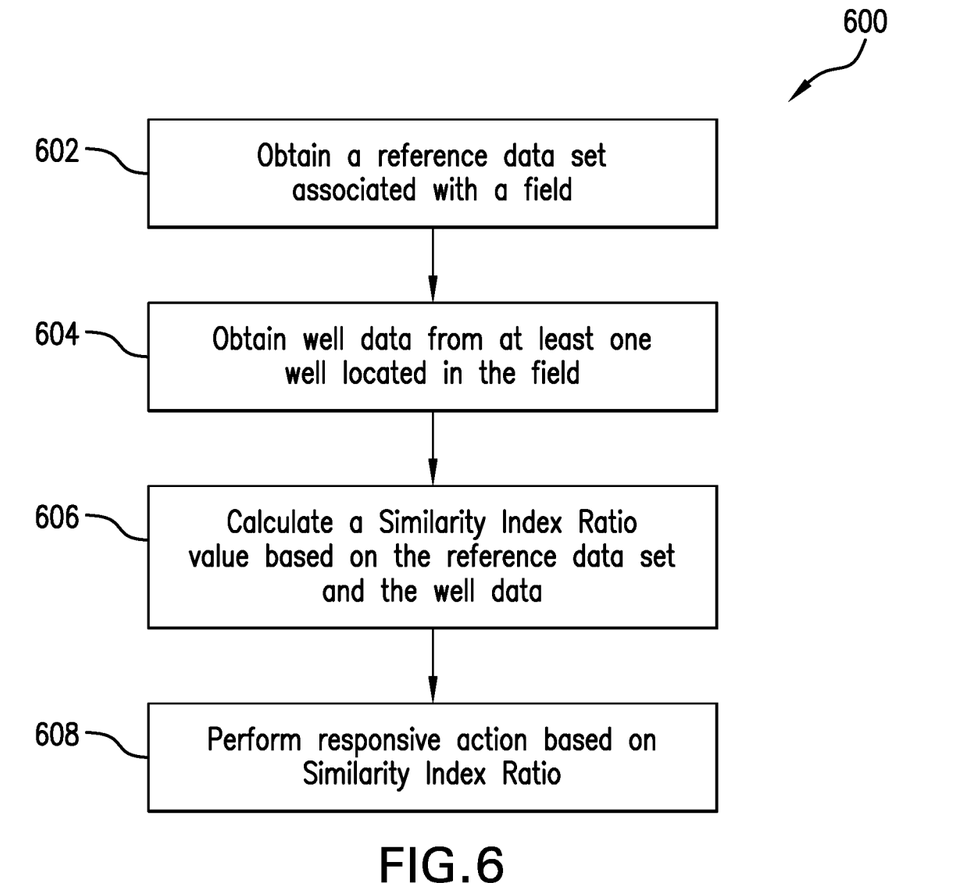
FIG. 6 is a flow process in accordance with an embodiment of the present disclosure.

Turning to FIG. 6, a flow process 600 in accordance with an embodiment of the present disclosure is shown. The flow process 600 can be used to make informed decisions related to field-wide downhole operations, including, but not limited to, drilling operations, productions operations, injection operations, etc.

At block 602, a reference data set is obtained, wherein the reference data set is associated with a field. A field, as used herein, refers to an area or region of the earth that includes multiple wells that are employed for downhole operations, such as exploration, drilling, injection, production, etc. In some embodiments, the reference data set can be obtained from a well of the field, with the reference data set including at least one value of interest associated with a characteristic or property of a downhole formation. In other embodiments, the reference data set can be synthetic or artificial and represent a projected or modeled data set that is expected to be observed during a downhole operation. The at least one value of interest associated with a characteristic or property can be or may be derived from, for example, chemical compositions, resistivity, neutron porosity or density values, gamma ray values, formation pressures, viscosity, magnetic resonance values, mobility, delta rho values, acoustic slowness values, total organic content, etc.

At block 604, well data from at least one well located in the field is obtained. The well data includes at least values associated with the respective well directed to the at least one value of interest associated with a characteristic or property (e.g., same variable or characteristic as the reference data set). In some embodiments, a plurality of well data sets can be obtained from a plurality of respective wells in the field.

At block 606, using the reference data set of block 602 and the well data of block 604, a Similarity Index Ratio SIR is calculated. The Similarity Index Ratio SIR can be a discrete or single value or may be a data set for an interval of depth of the reference data set and the well data. Thus, the Similarity Index Ratio SIR can be obtained and plotted against depth to enable observation of well similarity over a distance or depth interval.

At block 608, a responsive action can be performed in response to the calculated Similarity Index Ratio SIR. For example, the analysis of these accessible datasets (e.g., blocks 602-608) can influence drilling and production decisions. Such decision-making can be performed much faster than conventional laboratory geochemistry datasets. The responsive action taken can depend on the current downhole operation. For example, if active drilling is being performed, the Similarity Index Ratio SIR can be used to ensure that a drilling plan is maintained, with the reference data set being synthetic. Alternatively, in an active drilling operation, the reference data set may be based on a prior-drilled well, such that an operator can determine if the currently drilling operation is achieving a desired result, such as having a second well access a formation or compartment that the first (reference) well is accessing. In some embodiments, the information obtained from multiple wells in a field can be used to design production schemes. Further, such information can be used to progressively locate wells on a field (e.g., improved well planning). Furthermore, embodiments provided herein can be used to plan injector and/or projection wells based on accessible compartments and the compositions thereof.

Advantageously, embodiments provided herein are directed to generating a similarity index ratio to provide a fast, intuitive, and easy way to detect zones that show a similar response across a field. In contrast to previous applications, the information regarding similarities or differences as provided from embodiments of the present disclosure can be presented in a single plot. Further, advantageously, embodiment provided herein are not limited to fixed trends, input, or logs but is available for the comparison of various parameters based on depth. As such, the determination of (fluid) compartments based on logs at a field-wide scale or level can be achieved.

Embodiment 1

A method for performing downhole operations in a field having a plurality of wells, the method comprising: obtaining, at a computing system, a reference data set associated with the field, the reference data set including at least one property of a downhole formation; obtaining, at the computing system, a first well data set associated with a first well of the field, the first well data set including the at least one property of a downhole formation associated with the first well; calculating a similarity index ratio based on the reference data set and the first well data set, wherein the similarity index ratio indicates a similarity in values of the reference data set and the first well data set; and performing a responsive action based on the calculated similarity index ratio.

Embodiment 2

The method of any embodiment described herein, wherein the responsive action is one of adjusting a drilling operation, stopping a drilling operation, and developing a production scheme for the field.

Embodiment 3

The method of any embodiment described herein, wherein the similarity index ratio is calculated as $$SIR = \log\left(\frac{\beta_2}{\beta_1}\right),$$

wherein SIR is the similarity index ratio, $\beta_1$ is the reference data set and $\beta_2$ is the first well data set.

Embodiment 4

The method of any embodiment described herein, further comprising obtaining, at the computing system, a second well data set associated with a second well of the field, the second well data set including the at least one property of a downhole formation associated with the second well.

Embodiment 5

The method of any embodiment described herein, wherein a first similarity index ratio associated with the first well data is obtained and a second similarity index ratio associated with the second well data is obtained, the method further comprising determining locations where at least one of the first well and the second well match the reference data set.

Embodiment 6

The method of any embodiment described herein, wherein the reference data set is obtained from a well of the field.

Embodiment 7

The method of any embodiment described herein, wherein the reference data set and the first well data set are obtained over a depth interval located downhole.

Embodiment 8

The method of any embodiment described herein, further comprising determining a depth interval of similarity between the data set and the first well data set.

Embodiment 9

The method of any embodiment described herein, wherein the at least one property of a downhole formation comprises as least one of a chemical composition, a resistivity, a neutron porosity or density value, a gamma ray value, a formation pressure, a viscosity, a magnetic resonance value, a mobility, a delta rho value, an acoustic slowness value, and a total organic content.

Embodiment 10

The method of any embodiment described herein, further comprising transmitting from the first well to the computing system the first well data set.

Embodiment 11

The method of any embodiment described herein, wherein, when the similarity index ratio of the first well data set is between −0.1 and +0.1 when compared to a similarity index ratio of the reference data, the method comprises determining that the first well matches the reference data.

Embodiment 12

A system for conducting downhole operations at a field-wide scale, the system comprising: a first well located in the field, the first well arranged to collect a first well data set including at least one property of a downhole formation at the first well; a second well locating in the field, the second well arranged to collect a second well data set including at least one property of a downhole formation at the second well; and a computing system arranged in communication with the first well and the second well, the computing system configured to: collect the first well data set from the first well; collect the second well data set from the second well; obtain a reference data set; and calculate a similarity index ratio based on the reference data set and the first well data set, wherein the similarity index ratio indicates a similarity in values of the reference data set and the first well data set.

Embodiment 13

The system of any embodiment described herein, wherein the reference data set is based on the second well data.

Embodiment 14

The system of any embodiment described herein, wherein the similarity index ratio is calculated as $$SIR = \log\left(\frac{\beta_2}{\beta_1}\right),$$

wherein SIR is the similarity index ratio, $\beta_1$ is the reference data set and $\beta_2$ is the first well data set.

Embodiment 15

The system of any embodiment described herein, further comprising: a third well locating in the field, the third well arranged to collect a third well data set including at least one property of a downhole formation at the third well, wherein the computing system is arranged to compare similarity index ratios of the first, second, and third wells.

Embodiment 16

The system of any embodiment described herein, wherein a first similarity index ratio associated with the first well data is obtained and a second similarity index ratio associated with the second well data is obtained, the computing system further configured to determine locations where at least one of the first well and the second well match the reference data set.

Embodiment 17

The system of any embodiment described herein, wherein the reference data set and the first well data set are obtained over a depth interval located downhole.

Embodiment 18

The system of any embodiment described herein, wherein the computing system is further configured to determine a depth interval of similarity between the data set and the first well data set.

Embodiment 19

The system of any embodiment described herein, wherein the at least one property of a downhole formation comprises as least one of a chemical composition, a resistivity, a neutron porosity or density value, a gamma ray value, a formation pressure, a viscosity, a magnetic resonance value, a mobility, a delta rho value, an acoustic slowness value, and a total organic content.

Embodiment 20

The system of any embodiment described herein, wherein, when the similarity index ratio of the first well data set is between −0.1 and +0.1 when compared to a similarity index ratio of the reference data, the computing system determines that the first well matches the reference data.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively, or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The flow diagram(s) depicted herein is just an example. There may be many variations to this diagram or the steps (or operations) described therein without departing from the scope of the present disclosure. For instance, the steps may be performed in a differing order, or steps may be added, deleted or modified. All of these variations are considered a part of the present disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A method for performing downhole operations in a field having a plurality of wells, the method comprising:
    obtaining, at a computing system, a reference data set associated with the field, the reference data set including at least one property of a downhole formation;
    obtaining, at the computing system, a first well data set associated with a first well of the field, the first well data set including the at least one property of a downhole formation associated with the first well;
    calculating a similarity index ratio based on the reference data set and the first well data set, wherein the similarity index ratio indicates a similarity in values of the reference data set and the first well data set, wherein the similarity index ratio is based on mud gas analysis and represents ratios of gas compounds between the reference data set and the first well data set; and
    performing a responsive action based on the calculated similarity index ratio.

2. The method of claim 1, wherein the responsive action is one of adjusting a drilling operation, stopping a drilling operation, and developing a production scheme for the field.

3. The method of claim 1, wherein the similarity index ratio is calculated as $$SIR = \log\left(\frac{\beta_2}{\beta_1}\right),$$

wherein SIR is the similarity index ratio, $\beta_1$ is the reference data set and $\beta_2$ is the first well data set.

4. The method of claim 1, further comprising obtaining, at the computing system, a second well data set associated with a second well of the field, the second well data set including the at least one property of a downhole formation associated with the second well.

5. The method of claim 4, wherein a first similarity index ratio associated with the first well data is obtained and a second similarity index ratio associated with the second well data is obtained, the method further comprising determining locations where at least one of the first well and the second well match the reference data set.

6. The method of claim 1, wherein the reference data set is obtained from a well of the field.

7. The method of claim 1, wherein the reference data set and the first well data set are obtained over a depth interval located downhole.

8. The method of claim 7, further comprising determining a depth interval of similarity between the data set and the first well data set.

9. The method of claim 1, wherein the at least one property of a downhole formation comprises as least one of a chemical composition, a resistivity, a neutron porosity or density value, a gamma ray value, a formation pressure, a viscosity, a magnetic resonance value, a mobility, a delta rho value, an acoustic slowness value, and a total organic content.

10. The method of claim 1, further comprising transmitting from the first well to the computing system the first well data set.

11. The method of claim 1, wherein, when the similarity index ratio of the first well data set is between −0.1 and +0.1 when compared to a similarity index ratio of the reference data, the method comprises determining that the first well matches the reference data.

12. A system for conducting downhole operations at a field-wide scale, the system comprising:
 a first well located in the field, the first well arranged to collect a first well data set including at least one property of a downhole formation at the first well;
 a second well locating in the field, the second well arranged to collect a second well data set including at least one property of a downhole formation at the second well; and
 a computing system arranged in communication with the first well and the second well, the computing system configured to:
 collect the first well data set from the first well;
 collect the second well data set from the second well;
 obtain a reference data set; and
 calculate a similarity index ratio based on the reference data set and the first well data set, wherein the similarity index ratio indicates a similarity in values of the reference data set and the first well data set, wherein the similarity index ratio is based on mud gas analysis and represents ratios of gas compounds between the reference data set and the first well data set.

13. The system of claim 12, wherein the reference data set is based on the second well data.

14. The system of claim 12, wherein the similarity index ratio is calculated as $$SIR = \log\left(\frac{\beta_2}{\beta_1}\right),$$

wherein SIR is the similarity index ratio, $\beta_1$ is the reference data set and $\beta_2$ is the first well data set.

15. The system of claim 12, further comprising:
 a third well locating in the field, the third well arranged to collect a third well data set including at least one property of a downhole formation at the third well,
 wherein the computing system is arranged to compare similarity index ratios of the first, second, and third wells.

16. The system of claim 12, wherein a first similarity index ratio associated with the first well data is obtained and a second similarity index ratio associated with the second well data is obtained, the computing system further configured to determine locations where at least one of the first well and the second well match the reference data set.

17. The system of claim 12, wherein the reference data set and the first well data set are obtained over a depth interval located downhole.

18. The system of claim 17, wherein the computing system is further configured to determine a depth interval of similarity between the data set and the first well data set.

19. The system of claim 12, wherein the at least one property of a downhole formation comprises as least one of a chemical composition, a resistivity, a neutron porosity or density value, a gamma ray value, a formation pressure, a viscosity, a magnetic resonance value, a mobility, a delta rho value, an acoustic slowness value, and a total organic content.

20. The system of claim 12, wherein, when the similarity index ratio of the first well data set is between −0.1 and +0.1 when compared to a similarity index ratio of the reference data, the computing system determines that the first well matches the reference data.

* * * * *

UNITED STATES PATENT AND TRADEMARK OFFICE
CERTIFICATE OF CORRECTION

PATENT NO. : 10,830,040 B2
APPLICATION NO. : 15/728693
DATED : November 10, 2020
INVENTOR(S) : Jonas Kaiser, Nicklas Ritzmann and Stefan Wessling Page 1 of 1

It is certified that error appears in the above-identified patent and that said Letters Patent is hereby corrected as shown below:

In the Claims

Claim 8, Column 16, Line 62, delete "the data set" and insert therefor --the reference data set--.

Claim 18, Column 18, Line 25, delete "the data set" and insert therefor --the reference data set--.

Signed and Sealed this
Fifteenth Day of December, 2020

Andrei Iancu
*Director of the United States Patent and Trademark Office*